Aug. 22, 1944.  W. H. ALLEN  2,356,370
DICER FOR SUPERCHARGED AIRCRAFT CARBURETORS
Filed Feb. 2, 1942
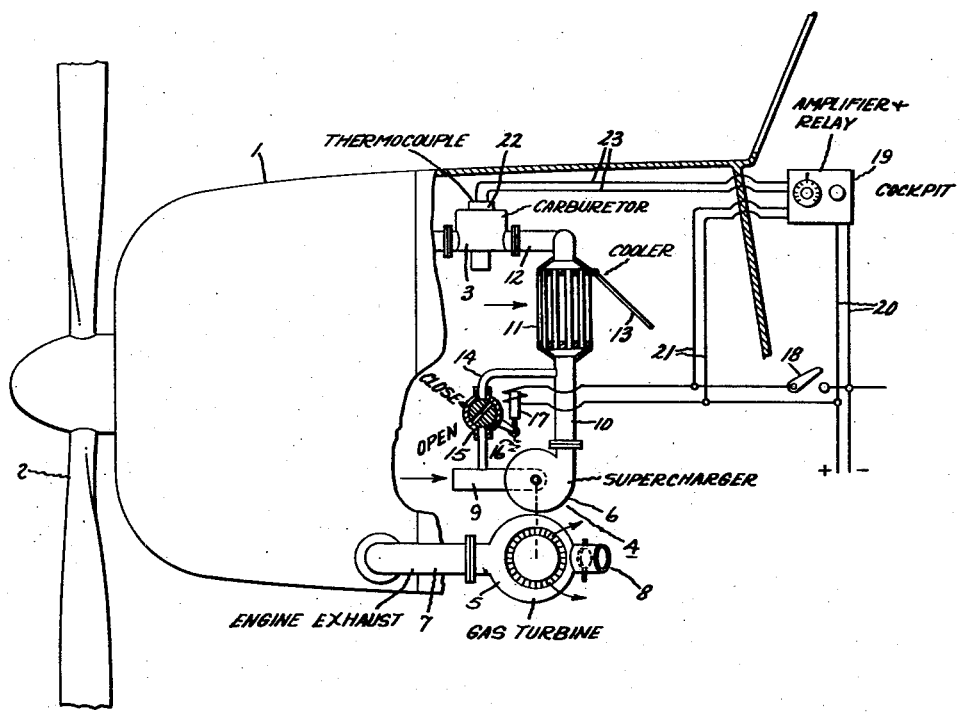
Inventor:
Wayne H. Allen,
by Harry E. Dunham
His Attorney.

Patented Aug. 22, 1944

2,356,370

UNITED STATES PATENT OFFICE 2,356,370

DEICER FOR SUPERCHARGED AIRCRAFT CARBURETOR

Wayne H. Allen, Los Angeles, Calif., assignor to General Electric Company, a corporation of New York Application February 2, 1942, Serial No. 429,227

3 Claims. (Cl. 123—122)

In the operation of aircraft at high altitudes, difficulty is sometimes experienced with the formation of ice within the carburetor and induction system. Ice may be formed due to the condition of the air with respect to temperature and humidity, or it may be formed due to vaporization of gasoline, termed usually "refrigeration ice." When an aircraft engine is equipped with a supercharger for supplying air to the carburetor, normally the heat imparted to the air due to compression of the air is sufficient to raise the air to a temperature of a value such that it prevents formation of ice within the carburetor and induction system. In fact, the compression may raise the temperature of the air well above that desired for the engine so that the air after being compressed is passed through an intercooler on its way from the compressor to the carburetor. However, there are times, for example when an aircraft is descending from a high altitude to a lower altitude, or cruising, when the engine or engines may be operating at very light load, and under these conditions the heat imparted to the air by the compressor may be insufficient to bring the air to a temperature sufficiently high to warm the carburetor and prevent icing. At such times, ice may be formed.

The object of my invention is to provide an improved construction and arrangement whereby I may, when desired, supply additional heat to the air being supplied by the supercharger to an aircraft carburetor.

In the drawing, the figure is a diagrammatic view of an arrangement embodying my invention.

Referring to the drawing, 1 indicates a part of a aircraft in which may be enclosed an engine driving a propeller 2. The carburetor for the engine is indicated at 3 and the supercharger is indicated at 4. In the present instance, a gas turbine supercharger is illustrated, the gas turbine being indicated at 5 and the centrifugal compressor at 6. 7 indicates a conduit for conveying exhaust gases from the engine to the nozzle box of the gas turbine, and 8 indicates the waste gate valve. The inlet for the centrifugal compressor is indicated at 9 and the discharge conduit is indicated at 10. Discharge conduit 10 conveys compressed air to an intercooler 11 from which the air flows to the carburetor 3 through a conduit 12. The flow of cooling air (air from the slip stream of the aircraft, for example) through the intercooler is controlled by a flap valve 13 which may be positioned in any suitable manner.

The arrangement so far described is to be taken as typical of an exhaust gas driven supercharger supplying air to the carburetor of an aircraft engine. The showing is diagrammatic. The arrangement and operation of such a supercharger is now well known and hence requires no further description.

According to my invention, I provide means whereby additional heat is supplied to the air when sufficient heat is not being imparted to the air by the compression to raise it to the desired temperature. According to the embodiment of my invention illustrated, I provide a by-pass conduit 14 which connects the discharge side of the centrifugal compressor to the inlet side, and in such conduit I provide a normally closed valve 15 arranged to be opened either manually by the operator or automatically to permit of recirculation of air through the compressor. With this arrangement, when valve 15 is opened, a part of the air discharged by the centrifugal compressor is conveyed back to the inlet side of the compressor and is acted upon a second time by the compressor with the result that additional heat is imparted to the air. In the present instance, valve 15 is shown as being biased to closed position by a spring 16 and as being adapted to be opened by a solenoid 17, the circuit of which may be closed by the operator by means of a switch 18 located in the cockpit. Also, for operating the valve, I provide automatic means responsive to carburetor temperature. This comprises a suitable amplifier and relay 19 which is connected to a source of electrical energy by wires 20; to electromagnet 17 by wires 21, and to a thermocouple 22 responsive to temperature of the carburetor by wires 23. Any suitable type of amplifier and relay may be used, it being only necessary to amplify the current from the thermocouple sufficiently to operate the relay to close the circuit on solenoid 17. Such devices having stable operating characteristics are known. Accordingly I have illustrated the device only diagrammatically.

During normal operation, valve 15 is closed and the supercharger supplies air to the carburetor, the valve 13 of the intercooler being positioned and adjusted to cool the air to the desired extent. In case the operating conditions are such that the temperature of the air supplied by the supercharger to the carburetor is not sufficiently high, even with the flap valve of the intercooler closed, the operator may close switch 18 so as to open valve 15 and effect recirculation of air, thus imparting additional heat to the air. If the operator does not close switch 18 and the temperature at the carburetor reaches a predetermined low value, then the thermocouple will operate through the amplifier and relay 19 to effect the opening of valve 15 so as to recirculate air and impart additional heat to it. Thus, I provide means whereby the supercharger may be operated to impart additional heat to the air passing through it.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In an aircraft, the combination of an engine, a carburetor for the engine, a supercharger having its discharge side connected to the inlet of the carburetor for supplying air to the carburetor, a by-pass connecting the discharge side of the supercharger to the inlet side thereof, a normally closed valve in said by-pass, and manual means for opening said valve whereby an operator at will can effect recirculation of air through the supercharger for imparting additional heat thereto.

2. In an aircraft, the combination of an engine, a carburetor for the engine, a supercharger having its discharge side connected to the inlet of the carburetor for supplying air to the carburetor, and automatic means controlled by the temperature of the carburetor for recirculating air through the supercharger whereby additional heat may be imparted by the supercharger to the air passing through it.

3. In an aircraft, the combination of an engine, a carburetor for the engine, a supercharger for supplying air to the carburetor, a by-pass connecting the discharge side of the supercharger to the inlet side thereof, a normally closed valve in said by-pass, and automatic means controlled by the temperature of the carburetor for positioning said valve to effect circulation of air through the supercharger whereby additional heat may be imparted by the supercharger to the air passing through it.

WAYNE H. ALLEN.